ELECTRICAL FISH TAPE WINDER

Filed May 13, 1960 2 Sheets-Sheet 1

Inventor
August Raymond Linden
Andrew F. Wintercorn
Atty.

Dec. 11, 1962 A. R. LINDEN 3,067,984

ELECTRICAL FISH TAPE WINDER

Filed May 13, 1960 2 Sheets-Sheet 2

Inventor
August Raymond Linden
Andrew F. Wintercorn
Atty

United States Patent Office 3,067,984
Patented Dec. 11, 1962

3,067,984

ELECTRICAL FISH TAPE WINDER

August Raymond Linden, Sycamore, Ill., assignor to Holub Industries, Inc., Sycamore, Ill., a corporation of Illinois Filed May 13, 1960, Ser. No. 29,118
7 Claims. (Cl. 254—134.3)

This application is a continuation-in-part of my copending application, Serial No. 619,338, filed October 30, 1956, and now abandoned, including the improvements disclosed in my copending application, Serial No. 716,081, filed February 19, 1958, and now abandoned.

This invention relates to fish tape winders for use by electricians as a reel for paying out and winding up a steel fishing tape used in pulling wires through conduits.

The principal object of my invention is to improve reels of the type first disclosed in Hormel Patent No. 1,890,945, issued December 13, 1932, with a view to reducing the amount of effort expended in the operation thereof and maintaining better control of the tape, so that there is less likelihood of getting the tape twisted, kinked or bent. It is particularly important in the operation of such reels to maintain complete control of the tape, which, being of tempered steel, exerts considerable pressure in the direction of uncoiling and straightening itself out, so that unless there is always a positive hold on the tape the danger arises of the tape springing out accidentally and catching onto things in the vicinity, and, bearing in mind that these reels are frequently used in the vicinity of switchboards and other current-carriers, electrical shorts and damage to equipment becomes a possibility, and even electrocution.

In the reels of my invention, a handle that serves as a bearing for the hollow, circular, spring metal case to slide in and as a guide for the tape, is arranged to have the case turned relative to it in one direction to pay out the tape and turned in the opposite direction to wind it up, the handle being held in one hand and the case being turned relative to the handle with the other hand, so that the operator always has the tape under complete control. For the guiding function, I provide two guides in a fixed relationship to one another and always in the same relationship to the periphery of the case and to the circumferential slot therein, one of said guides engaging the inner face of the tape and being defined in one end of an opening provided in one end of the handle radially outwardly with respect to the case, and the other of said guides being defined by a shoe projecting radially inwardly from the handle through the circumferential slot in the case, to ride on the outer face of the tape inside the case and always maintain about the same angularity of the extending tape with respect to the handle, the tape extending through the slot in the case at a point between the two guides, and the case being constructed so that the side walls tend normally to spring toward each other to maintain a slot narrower than the width of the tape, thereby maintaining uniform frictional drag on the tape at the slot. The shoe presses the tape inwardly, so that it winds smoothly on the rest of the tape in the case and slides with substantially uniform pressure on the guide in the far end of the opening in the handle, as a second means of exerting frictional drag on the tape for its more complete control and to insure against kinking or bending of the tape as it moves in or out. The sliding friction of the handle on the case also accounts for a third part of the frictional drag, and, inasmuch as all three factors of frictional drag mentioned are fairly uniform there is no appreciable variation in the frictional drag in the operation of the device.

In the main or preferred form, the slot in the case is widened solely by contact with the opposed longitudinal edges of the tape for frictional drag, but, in a modified or alternative form, the shoe is cam-shaped and at least as thick as the width of the tape to at least help in the spreading of the slot, if not assuming the major role or sole role, and accordingly relative wear on the case on opposite sides of the slot and also afford frictional drag.

The invention is illustrated in the accompanying drawings, in which—

Similar reference numerals are applied to corresponding parts throughout the views.

Figures 1, 2, 3, 4:
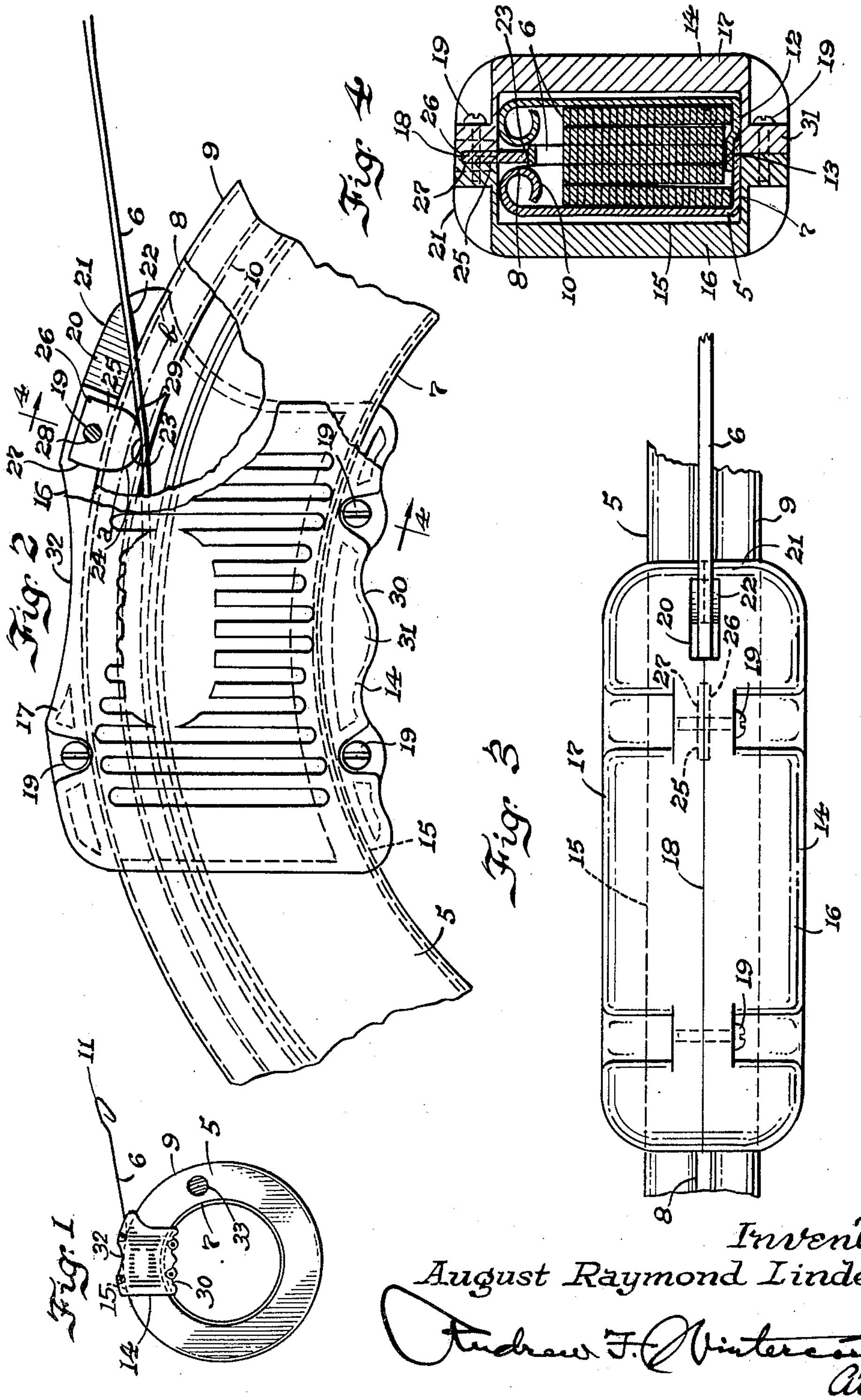
FIG. 1 is a side view of a fish tape winder made in accordance with my invention, and shown on a reduced scale.
FIG. 2 is a view in side elevation of a portion of the device of FIG. 1, shown approximately full size, a portion of the case and an adjacent portion of the handle being broken away to enable showing the guide defining opening provided in the handle and also the guide shoe carried on the handle slidably engaging the tape inside the case.
FIG. 3 is a top view of FIG. 2.
FIG. 4 is a cross-section on the line 4—4 of FIG. 2.

Referring to FIGS. 1–4, the reference numeral 5 designates the hollow, circular, spring metal reel-case constructed along the lines of that disclosed in the Hormel Patent 1,890,945, the same being of annular, hollow, channel form and arranged to have the coil of steel fish tape 6 wound therein around its radially inner wall 7 and extend out through the circumferentially extending peripheral slot 8, that is defined in the middle of the radially outer wall 9 between the inwardly curled edge portions 10. The width of the slot 8 is normally narrower than the width of the tape 6, so that as the tape is withdrawn the rounded sides of the slot 8 snugly and firmly frictionally engage the lateral edges of the tape, and, due to the fact that the case 5 is of spring sheet steel construction having spring-like resiliency, the pressure on the tape 6 is resilient and there is, therefore, fairly uniform frictional drag exerted. The tape 6 is of high carbon steel, harder than the metal in case 5, so that no burrs or sharp edges are formed on the tape in its winding onto and unwinding off the reel through the slot 8. Due to the rounded surfaces on the case 5 on opposite sides of the slot 8, coupled with the hardness of the metal of the case, there is very little wear on the latter. A suitable clip projection is provided on the radially inner wall 7 of the case for connection of a hooked inner end of the tape, not shown, and a hook 11 is formed on the outer end of the tape for connection with the wire to be pulled through the conduit. The case 5 is of two-piece construction, the inner annular flanges 12 on the two pieces having a telescoping fit and being spot-welded together at circumferentially spaced intervals, as indicated at 13 in FIG. 4.

In accordance with my invention, a hollow, or tubular elongated handle 14 provides an arcuate bearing 15 therein, in which the case 5 is slidable freely and arranged to be turned in one direction relative to the handle in paying out tape and in the opposite direction in the winding up of the tape. For simplicity of construction and economy of manufacture, the handle is die-cast in two halves 16 and 17, each of arcuate form lengthwise and channel cross-section, the two halves abutting in the longitudinal median plane of the handle, as indicated at 18, and being fastened together by four screws 19. At one end the handle 14 has a guide defining opening 20 provided in its radially outer wall 21, and the tape 6 is slidable freely on its inner face on a flat guide surface 22 defined at the forward end of the opening at an acute angle to the periphery of the case 5, as clearly illustrated in FIGS. 2 and 3. The tape 6 is slidably engaged on its outer face, as at 23, by the rounded radially inner end 24 of a guide shoe 25, that is provided in the handle 14 and is in the form of a plate that is thin in relation to the width of the tape 6, as seen in FIG. 3, and extends freely through slot 8 in the case 5, and has a rectangular attaching portion 26 fitting non-rotatably in registering recesses 27 provided in the abutting portions of the halves 16 and 17 defining the radially outer wall 21 of the handle. A hole 28 in the attaching portion 26 registers with the holes in the handle halves receiving one of the screws 19, when the shoe plate 25 is to be positively locked in place by the screw. It will, therefore, be seen that the guide defined at 23 is inside the case 5, whereas the guide defined at 22 is outside the case, and yet both are provided in a fixed relationship to one another and to the case 5 and handle 14, and it is between these two points 22 and 23 of guiding engagement with the inner face and outer face of the tape 6 that the opposite sides of the slot 8 have the sliding frictional engagement with the lateral edges of the tape, as previously described, that engagement being at the point 29, where the arcuate dot and dash line *a—b*, marking the line of contact of slot 8 with tape 6, intersects the tape. There is narrow line contact at 23 and 29 and surface contact at 22 continually in the paying out of the tape or winding up thereof, and since there are no moving parts to get out of order and fail to function properly, the device is never apt to require any attention other than possibly occasional lubrication of the tape with graphite. Also, the absence of any movable parts on the handle requiring one special positioning for winding up tape and another special positioning for paying out tape, is of advantage because it eliminates confusion and simplifies the operation of the device while assuring the same good performance every time.

In operation, the shoe 25 riding on the outer face of the tape 6, within the case 5, cooperates with the guide 22 engaging the inner face of the tape 6, outside the case 5, to maintain positive control of the tape at all times, so that there is no likelihood of its getting twisted, kinked or bent and never any possibility of the tape accidentally springing loose from the case and getting hooked onto adjacent objects, with possible resulting damage in case of current-carrying devices, and even electrocution. Whereas some other fish tape winders have been rather awkward to handle with two hands, especially where a part had to be held one way for winding up tape and another way for paying out tape, the present device is operable easily by holding the handle 14 always in the same way in one hand and turning the case 5 relative to it with the other hand, the finger grip depressions 30 provided in circumferentially spaced relation in the radially inner wall 31 of the handle radially opposite the arcuate depression 32 in the outer wall making the handle form-fitting and reducing likelihood of slippage. The shoe 25 always presses the tape 6 radially inwardly to maintain it in contact with the guide 22, and also keep the wound-portion down in close contact with the rest of the tape inside the case, as illustrated in FIG. 2. There is, therefore, substantially the same frictional drag on the movement of the tape in either direction relative to the handle 14 no matter how little or how much of the tape has been paid out, inasmuch as the frictional drag imposed on the lateral edges of the tape at 29, between the two guides 22 and 23, always remains the same and there is nothing that is apt to cause any variation in frictional drag otherwise in the operation of the device. There are no rollers or wheels or other moving parts of any kind on the handle to require special positioning by the operator during winding and another special positioning during unwinding, and there is also nothing apt to require replacement or repair. There is never any need for the operator having to take hold of the tape to wind it or unwind it, inasmuch as the paying-out and winding-in are both incidental to the turning of the case relative to the handle due to the novel arrangement of the two guides on the handle. One or more holes 33 are provided in the side wall of the case 5 to serve as windows through which the operator can check now and then during use of the device to see how much tape is left in reserve when any considerable length is paid out.

Figures 5, 6, 7, 8, 9:
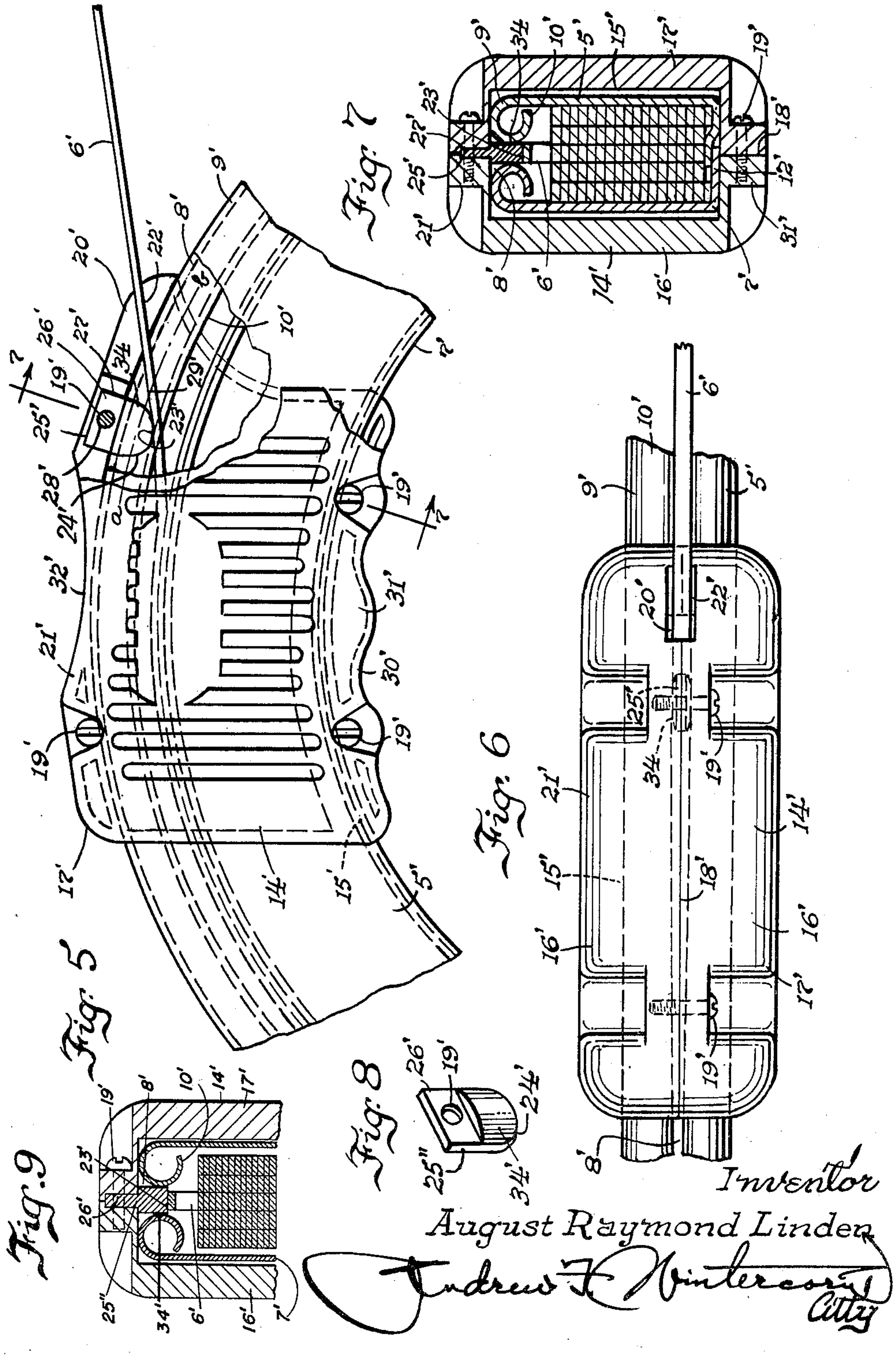
FIG. 5 is a view like FIG. 2 showing a modified or alternative construction in which the guide shoe is cam-shaped to perform a portion of the slot spreading function.
FIG. 6 is a top view of FIG. 5.
FIG. 7 is a cross-section on line 7—7 of FIG. 5.
FIG. 8 is a perspective view of another guide shoe like that shown in FIGS. 5–7, but thicker to perform the entire slot spreading function.
FIG. 9 is a section corresponding to the upper portion of FIG. 7 but showing how the thicker guide shoe of FIG. 8 performs the entire slot spreading function.

Referring next to FIGS. 5–7, wherein prime numerals are used to designate parts corresponding to those in FIGS. 1–4, the width of the slot 8′ is normally narrower than the width of the tape 6′ and, due to the fact that the case 5′ is of spring sheet steel construction having spring-like resilience, the slot 8′ may be spread open approximately to the width of the tape by the cam-shaped surfaces 34 on the sides of the shoe 25′ in the vicinity where the tape 6′ extends through the slot 8′, so that the tape performs only part of the slot spreading function and therefore can move in or out more freely than the tape 6 of FIGS. 1–4 and may accordingly be wound up onto the reel or paid out from the reel more easily. There is, of course, frictional drag exerted on the movement of the tape 6′ by reason of the sliding engagement of the arcuate guide edge 24′ of shoe 25′ on the outer face of the tape 6′, while the inner face of the tape slidably engages the inclined flat guide surface 22′ defined at the forward end of the guide opening 20′ provided in one end of the handle 14′. The latter slides on the reel but not easily enough for the tape to cause it to slide. There is therefore no danger of the fish tape 6′ getting out of control and unwinding freely under the uncontrolled spring action of the tape itself, due to its tendency to spring out to a straightened form. The line contact at guide 24′ and surface contact at guide 22′ are both wide enough so that there will be no perceptible wear on the tape.

In operation, the arcuate radially inner edge 24′ of the shoe 25′ sliding on the outer face of the tape 6′ within the case 5′ cooperates with the flat guide surface 22′ slidably engaging the inner face of the tape outside the case 5′ to maintain positive control of the tape at all times so that there is never any likelihood of its getting twisted, kinked or bent. The frictional drag on the movement of the tape relative to the shoe 25′ and guide surface 22′ is uniform so that there is no likelihood of the tape accidentally springing loose from the case and getting hooked onto adjacent objects, with possible resulting damage in case of current carrying devices, and even electrocution of the operator. The shoe 25′ by virtue of its cam 34 helps the tape 6′ spread the slot 8′ by spreading the slot in the vicinity where the tape 6′ extends through the slot, but the tape in doing some of the slot spreading function accounts for a good part of the frictional drag imposed upon its movement. If the thickness of the cam portion 34 of shoe 25′ is varied in relation to the width of the tape 6′, the cam can, of course, assume just as much of the slot spreading function as desired, and, obviously, if the thickness of the cam is increased to the extent shown at 34′ on shoe 25″ in FIGS. 8 and 9, where the cam is appreciably thicker than the width of tape 6′, the cam will assume this function entirely.

It is believed the foregoing description conveys a good understanding of the objects and advantages of my invention. The appended claims have been drawn to cover all legitimate modifications and adaptations.

I claim:

1. In a fish tape winder, a hollow circular reel case of channel section having a pair of side walls with inwardly directed edge portions defining a narrow slot circumferentially of the outer periphery of the case, the case being of spring metal construction and adapted to have the side walls sprung apart to widen the slot, a spring steel tape of substantially rectangular section and of a width wider than said slot before said slot is widened and wound in said case and extending through said slot which is widened solely by contact with the tape to give a tight friction drag fit, and a hollow handle of elongated form having an arcuate bearing therein through which a segment of said case extends with a sliding fit so as to permit turning the case relative to said handle, said handle having two guides provided thereon for slidable engagement with said tape, which guides are always in the same relationship to one another and to the case in longitudinally and radially spaced relation to one another in said handle and radially inwardly and radially outwardly relative to the slot, respectively, on opposite sides of the point in the slot where the tape is continually in the same friction drag relationship to the case, said guides maintaining the outgoing length of tape at a predetermined acute angle with respect to the handle and periphery of said case, said handle being of two-piece construction, the same being split in the longitudinal median plane thereof, said handle having registering openings provided therein in the radially outer portion thereof at one end of said handle elongated longitudinally of said handle, one of the two guides being defined at one end of said registering openings, and a shoe plate carried by said handle and projecting radially inwardly therefrom through the slot in the case providing the other of said guides and having its radially inner end disposed in contact with the outer side of the tape inside the case.

2. In a fish tape winder, a hollow circular reel case of channel section having a pair of side walls with inwardly directed edge portions defining a narrow slot circumferentially of the outer periphery of the case, the case being of spring metal construction and adapted to have the side walls sprung apart to widen the slot, a spring steel tape of substantially rectangular section and of a width wider than said slot before said slot is widened and wound in said case and extending through said slot which is widened solely by contact with the tape to give a tight friction drag fit, and a hollow handle of elongated form having an arcuate bearing therein through which a segment of said case extends with a sliding fit so as to permit turning the case relative to said handle, said handle having two guides provided thereon for slidable engagement with said tape, which guides are always in the same relationship to one another and to the case in longitudinally and radially spaced relation to one another in said handle and radially inwardly and radially outwardly relative to the slot, respectively, on opposite sides of the point in the slot where the tape is continually in the same friction drag relationship to the case, said guides maintaining the outgoing length of tape at a predetermined acute angle with respect ot the handle and periphery of said case, said handle being of two-piece construction, the same being split in the longitudinal median plane thereof, means for securing the two halves of the handle together, said handle having registering openings provided therein in the radially outer portion thereof at one end of said handle elongated longitudinally of said handle, one of the two guides being defined at one end of said registering openings, and a shoe plate carried by said handle and projecting radially inwardly therefrom through the slot in the case providing the other of said guides and having its radially inner end disposed in contact with the outer side of the tape inside the case, the radially outer end of said plate being secured to said handle by said securing means.

3. A fish tape winder comprising a circular hollow reel case, a fish tape wound thereon and having a free end portion extending from the periphery thereof, spring pressed means defining a narrow circumferential slot in the periphery of said case normally narrower than the tape and applying friction drag on the edge of said tape at the point of the tape's leaving the case, and a hollow handle of elongated form having an arcuate bearing therein through which a segment of said case extends with a sliding fit so as to permit turning the case relative to said handle, said handle having two guides provided thereon for slidable engagement with said tape, which guides are always in the same relationship to one another and to the case in longitudinally and radially spaced relation to one another in said handle and radially inwardly and radially outwardly relative to the slot, respectively, on opposite sides of the point in the slot where the tape is continually in the same friction drag relationship to the case, said guides maintaining the outgoing length of tape at a predetermined acute angle with respect to the handle and periphery of said case, said handle being of two-piece construction, the same being split in the longitudinal median plane thereof, said handle having registering openings provided therein in the radially outer portion thereof at one end of said handle elongated longitudinally of said handle, one of the two guides being defined at one end of said registering openings, and a shoe plate carried by said handle and projecting radially inwardly therefrom through the slot in the case providing the other of said guides and having its radially inner end disposed in contact with the outer side of the tape inside the case.

4. In combination, an annular fish tape reel comprising a hollow circular case of channel-section having a pair of side walls with inwardly directed edge portions defining a continuous circumferentially extending narrow slot, a spring steel fish tape that is wound on said reel and has its outer end portion extending through said slot, the slot being normally slightly narrower than the width of the fish tape so as to retain it, the case being of spring metal construction and adapted to have the side walls sprung apart to widen the slot but otherwise maintain the narrower width under spring action, a hollow handle of elongated form having an arcuate bearing therein through which a segment of the case extends with a sliding fit, whereby the handle is slidable circumferentially relative to the reel and adapted to be grasped and the case turned manually in either direction with respect thereto, and two guides for slidable engagement with said tape provided on said handle, which guides are maintained by said arcuate bearing always in the same relationship to one another and to the handle and case in longitudinally and radially spaced relation to one another in said handle and radially inwardly and radially outwardly relative to the slot, respectively, on opposite sides of the point in the slot where the tape extends from the case, said handle having an opening provided therein in the radially outer portion thereof elongated longitudinally of said handle, one of said guides being defined at one end of said opening for sliding engagement with the inner face of said tape, the other of said guides projecting from said handle through the slot into said case for sliding engagement with the outer face of said tape at a level radially inwardly relative to the slot with respect to the first mentioned guide and including a slot-spreader portion that is approximately the same width as the tape, so as to share with the tape in the slot-spreading function by sliding engagement in the slot in juxtaposition to the tape at the point where the tape extends from the case, said handle being of two-piece construction, the same being split in the longitudinal median plane thereof, the guide-defining opening in the handle being defined by registering openings provided in the two halves of the handle in the radially outer portion thereof at one end, the other guide being defined by a shoe plate disposed in the plane of the slot in the case and in the longitudinal median plane of the handle, the radially outer end portion of said plate being secured to said handle, and means for securing the handle halves together.

5. In combination, an annular fish tape reel comprising a hollow circular case of channel-section having a pair of side walls with inwardly directed edge portions defining a continuous circumferentially extending narrow slot, a spring steel fish tape that is wound on said reel and has its outer end portion extending through said slot, the slot being normally slightly narrower than the width of the fish tape so as to retain it, the case being of spring metal construction and adapted to have the side walls sprung apart to widen the slot but otherwise maintain the narrower width under spring action, a hollow handle of elongated form having an arcuate bearing therein through which a segment of the case extends with a sliding fit, whereby the handle is slidable circumferentially relative to the reel and adapted to be grasped and the case turned manually in either direction with respect thereto, and two guides for slidable engagement with said tape provided on said handle, which guides are maintained by said arcuate bearing always in the same relationship to one another and to the handle and case in longitudinally and radially spaced relation to one another in said handle and radially inwardly and radially outwardly relative to the slot, respectively, on opposite sides of the point in the slot where the tape extends from the case, said handle having an opening provided in the radially outer portion thereof elongated longitudinally of said handle, one of said guides being defined at one end of said opening for sliding engagement with the inner face of said tape, the other of said guides projecting from said handle through the slot into said case for sliding engagement with the outer face of said tape at a level radially inwardly relative to the slot with respect to the first mentioned guide and including a slot-spreader portion that is wider than the tape so as to spread the slot at least as wide as the tape by sliding engagement in the slot in juxtaposition to the tape at the point where the tape extends from the case, said handle is of two-piece construction, the same being split in the longitudinal median plane thereof, the guide-defining opening in the handle being defined by registering openings provided in the two halves of the handle in the radially outer portion thereof at one end, the other guide being defined by a shoe plate disposed in the plane of the slot in the case and in the longitudinal median plane of the handle, the radially outer end portion of said plate being secured to said handle, and means for securing the handle halves together.

6. In a fish tape winder, a hollow circular reel case of channel section having a pair of side walls with inwardly directed edge portions defining a narrow slot circumferentially of the outer periphery of the case, a spring steel tape of substantially rectangular section wound in said case and extending therefrom through said slot, and a hollow handle of elongated form having an arcuate bearing therein through which a segment of said case extends with a sliding fit so as to permit turning the case relative to said handle, said handle having two guides provided thereon for slidable engagement with said tape, which guides are maintained by said arcuate bearing always in the same relationship to one another and to the case in longitudinally and radially spaced relation to one another in said handle and radially inwardly and radially outwardly relative to the slot, respectively, on opposite sides of the point in the slot where the tape extends from the case, said guides maintaining the outgoing length of tape at a predetermined acute angle with respect to the handle and periphery of said case, said handle being of two-piece construction, the same being split in the longitudinal median plane thereof, said handle having registering openings provided therein in the radially outer portion thereof at one end of said handle elongated longitudinally of said handle, one of the two guides being defined at one end of said registering openings, and a shoe plate carried by said handle and projecting radially inwardly therefrom through the slot in the case providing the other of said guides and having its radially inner end disposed in contact with the outer side of the tape inside the case.

7. In a fish tape winder, a hollow circular reel case of channel section having a pair of side walls with inwardly directed edge portions defining a narrow slot circumferentially of the outer periphery of the case, a spring steel tape of substantially rectangular section wound in said case and extending therefrom through said slot, and a hollow handle of elongated form having an arcuate bearing therein through which a segment of said case extends with a sliding fit so as to permit turning the case relative to said handle, said handle having two guides provided thereon for slidable engagement with said tape, which guides are maintained by said arcuate bearing always in the same relationship to one another and to the case in longitudinally and radially spaced relation to one another in said handle and radially inwardly and radially outwardly relative to the slot, respectively, on opposite sides of the point in the slot where the tape extends from the case, said guides maintaining the outgoing length of tape at a predetermined acute angle with respect to the handle and periphery of said case, said handle being of two-piece construction, the same being split in the longitudinal median plane thereof, means for securing the two halves of the handle together, said handle having registering openings provided therein in the radially outer portion thereof at one end of said handle elongated longitudinally of said handle, one of the two guides being defined at one end of said registering openings, and a shoe plate carried by said handle and projecting radially inwardly therefrom through the slot in the case providing the other of said guides and having its radially inner end disposed in contact with the outer side of the tape inside the case, the radially outer end of said plate being secured to said handle by said securing means.

References Cited in the file of this patent

UNITED STATES PATENTS

| | | |
|---|---|---|
| 2,689,709 | Waldschmidt | Sept. 21, 1954 |
| 2,695,141 | Rossey | Nov. 23, 1954 |
| 2,776,095 | Emmert | Jan. 1, 1957 |
| 2,893,655 | Carlson | July 7, 1959 |

UNITED STATES PATENT OFFICE

CERTIFICATE OF CORRECTION

Patent No. 3,067,984 December 11, 1962

August Raymond Linden

It is hereby certified that error appears in the above numbered patent requiring correction and that the said Letters Patent should read as corrected below.

Column 5, line 61, for "ot" read -- to --; column 6, line 6, for "edge" read -- edges --.

Signed and sealed this 18th day of June 1963.

(SEAL)
Attest:

ERNEST W. SWIDER
Attesting Officer

DAVID L. LADD
Commissioner of Patents